United States Patent [19]

Lilly

[11] 4,088,232

[45] May 9, 1978

[54] APPARATUS WITH STORAGE CELLS DISPOSED ADJACENT VERTICAL SHAFTS HAVING COVERS AND A LIFT MEANS MOVABLE THEREABOVE

[75] Inventor: George E. Lilly, South Bend, Ind.

[73] Assignee: Clark Equipment Co., Buchanan, Mich.

[21] Appl. No.: 457,100

[22] Filed: Apr. 1, 1974

[51] Int. Cl.² .............................................. B65G 1/06
[52] U.S. Cl. .............................. 214/16.4 A; 294/65.5; 214/730
[58] Field of Search ........ 214/15 R, 16.4 A, 16.1 CB, 214/16.1 CC, 18 PH, 730, 16.4 R; 294/65.5

[56] References Cited

U.S. PATENT DOCUMENTS

| | | | |
|---|---|---|---|
| 2,535,961 | 12/1950 | Schutt | 214/16.4 A |
| 2,981,423 | 4/1961 | Randell et al. | 214/18 PH |
| 3,161,303 | 12/1964 | Burrows | 214/16.1 CB |
| 3,202,242 | 8/1965 | Dolphin | 214/730 X |
| 3,232,454 | 2/1966 | Coursey | 214/16.1 CB |
| 3,412,876 | 11/1968 | Calabrese | 214/16.4 A X |
| 3,422,971 | 1/1969 | Wright | 214/15 R |
| 3,599,818 | 8/1971 | Stanton | 214/730 X |
| 3,622,019 | 11/1971 | Lorrek | 214/18 PH |
| 3,734,312 | 5/1973 | Hickinbotham | 214/16.4 A |

FOREIGN PATENT DOCUMENTS

| | | | |
|---|---|---|---|
| 1,072,041 | 9/1954 | France | 214/15 R |
| 1,107,720 | 1/1956 | France | 214/16.1 CB |
| 1,258,047 | 2/1961 | France | 214/18 PH |
| 714,071 | 8/1954 | United Kingdom | 214/15 R |
| 235,625 | 12/1969 | U.S.S.R. | 214/16.4 A |

Primary Examiner—Trygve M. Blix
Assistant Examiner—R. B. Johnson
Attorney, Agent, or Firm—Marmaduke A. Hobbs

[57] ABSTRACT

A product and material storage system having blocks of cells arranged in tiers around a plurality of shafts in which a lift moves to carry a load to any selected tier or level, and a means is provided in said lift for moving the loads laterally from the shaft into and from selected cells along the shaft. The load preferably enters and leaves the shaft at the top, and a floor covers the top of the structure so that a vehicle for operating the lift and carrying the load to and from the shaft can be maneuvered to any desired location and over any particular shaft. Covers close the upper ends of the shafts and provide a smooth floor, the covers being removable, preferably by the load carrying vehicle, when a load is to be introduced into or removed from a particular shaft. The cells may be in groups of various numbers including three, four and six to obtain a dense storage arrangement without the necessity of moving one load in order to reach or deposit another load.

7 Claims, 15 Drawing Figures

APPARATUS WITH STORAGE CELLS DISPOSED ADJACENT VERTICAL SHAFTS HAVING COVERS AND A LIFT MEANS MOVABLE THEREABOVE

The conventional product storage system consists of parallel rack structures on either side of an aisle in which a lift truck or other lift mechanism operates to move products and material, often in containers or bins, to a particular tier, and then lifts and deposits the products or material in a storage space in one of the two racks on either side of the aisle. There are certain inherent disadvantages in this type of conventional storage system, including a high percentage of space required for the aisle for the amount of storage space in the overall system, difficulty in controlling the loads while lifting and lowering the loads with a lift truck and placing the loads in the desired storage space, likelihood of an accident involving the truck and/or driver, and relatively high capital investment and operating costs. Other types of product and material storage systems are either expensive to install and operate, are inefficient and unreliable, or do not permit availability of any particular load, such as a container or bin, without shifting or otherwise moving other loads before reaching and removing the desired load. It is therefore one of the principal objects of the present invention to provide a product storage system which gives high density storage, and which is so constructed and designed that the products and materials stored therein can readily be removed without shifting or otherwise moving other stored products or materials.

Another object of the invention is to provide a multiple level product storage system which gives direct random access to any storage space at any time regardless of the amount of storage space being utilized, and which provides effective and reliable control of the apparatus handling the load therein and permits easy access to all storage spaces by the way of vertical shafts, so spaced from one another in the storage structure, that four spaces or bins are immediately accessible by the apparatus at any level in any one shaft.

Still another object is to provide a top oriented storage structure and operating mechanism therefor, which consists of vertical blocks of storage spaces grouped around a shaft, and which utilizes a lift operated from the top of the shaft for loading and unloading the storage area from the top of the structure.

Another object of the invention is to provide a top loading storage structure of the aforementioned type, which is adapted to extend principally down from ground level, and is provided with a top floor surface which permits a load handling vehicle to maneuver over any particular shaft to load and unload storage spaces clustered vertically around the shaft, and which permits the load to be unloaded from and loaded on trucks or railroad cars at substantially ground level.

Yet another object is to provide a relatively simple high capacity storage structure and operating mechanism, which is economical to build and operate, and which can be conveniently serviced and maintained in optimum operating condition, normally at little expense.

Another object is to provide a method of loading and unloading the storage structures of the aforementioned type.

A further object of the invention is to provide a storage system of the aforesaid type which minimizes fire hazards and gives maximum protection to the products stored therein and to the personnel operating the system, and which gives maximum security to the stored products and material from theft and vandalism.

Additional objects and advantages will become apparent from the following description and accompanying drawings, wherein.

Figure 1:
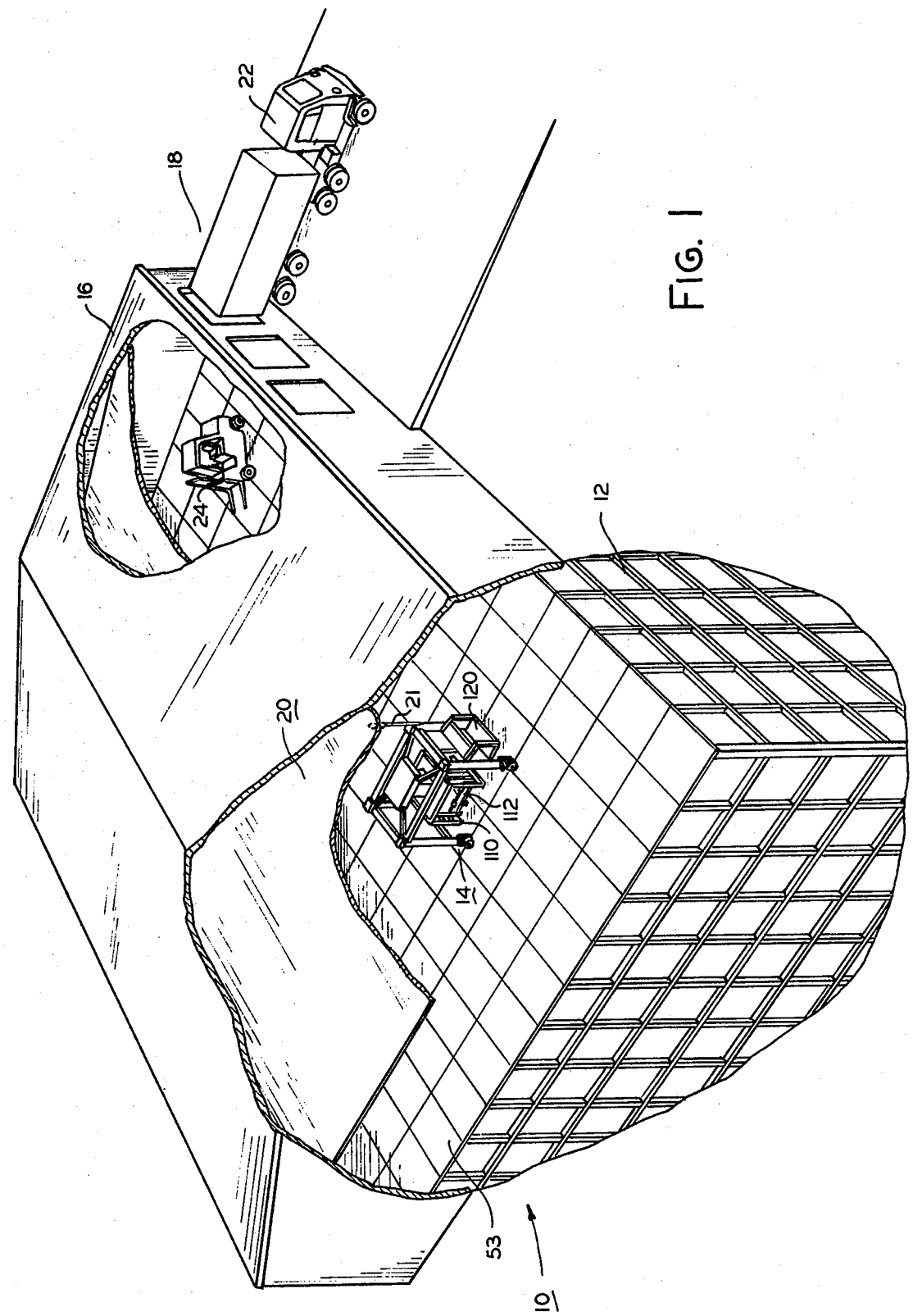
FIG. 1 is a fragmentary perspective view of the present storage system, illustrating the manner in which it may be installed and used.
Figure 2:
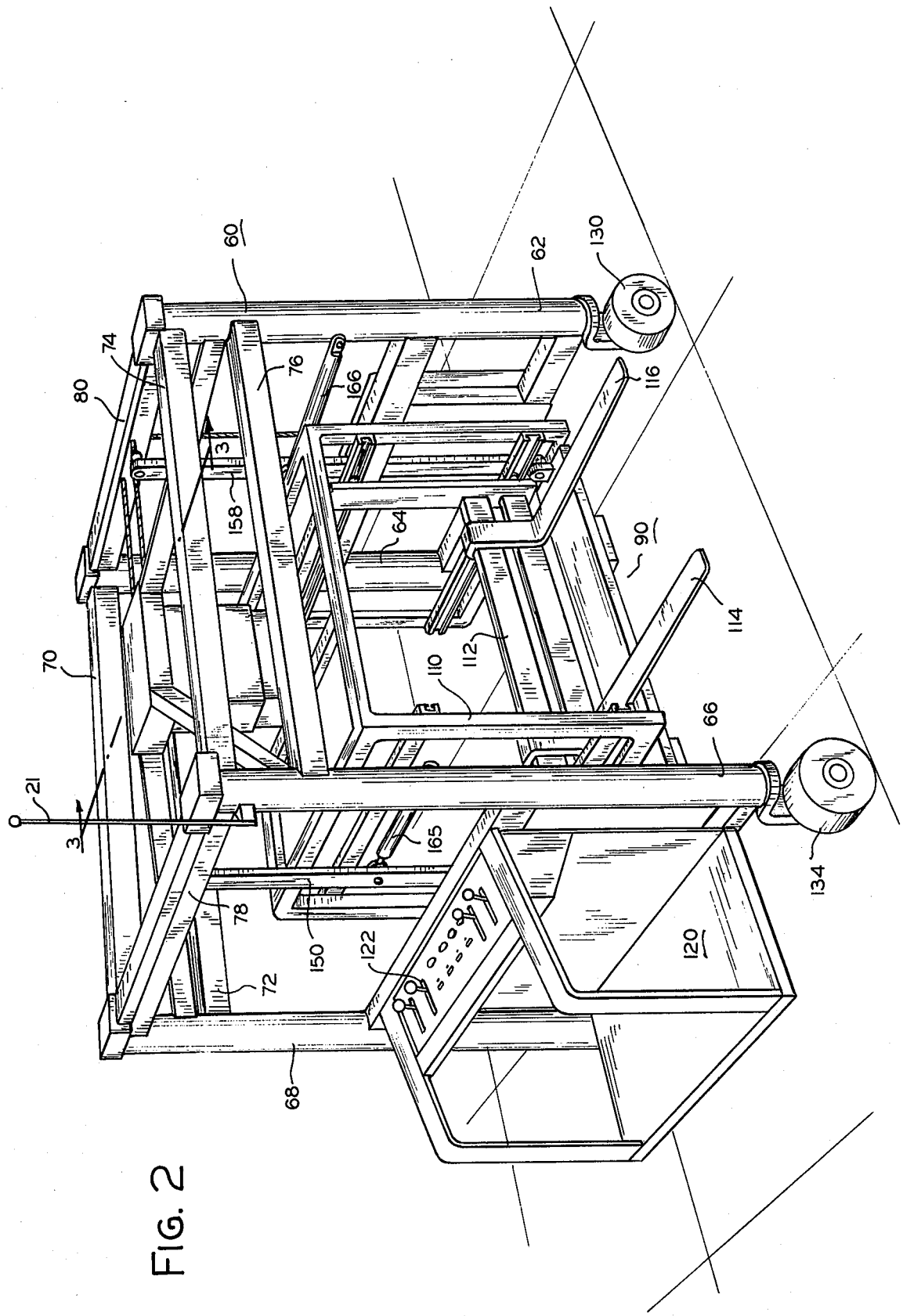
FIG. 2 is a perspective view of a vehicle used in transporting loads to and from the storage structure.

Referring more specifically to the drawings, and to FIG. 1 in particular, numeral 10 designates generally the storage system embodying the present invention, and numeral 12 indicates a storage structure extending downwardly from substantially ground level, 14 a vehicle for loading and unloading the products and material in storage structure 12, and 16 a building enclosing the upper end of the storage structure and having a loading dock 18, a ceiling 20 being shown which supports a power grid for operating vehicle 14 through an electrical trolley pole 21. A truck 22 is shown at the loading dock for discharging loads into and receiving loads from the storage system. A lift truck 24 is shown which assists in transferring loads from the truck to the load handling vehicle 14. The present system is adaptable to various types of structures and arrangements and, while the upper end thereof is preferably at or near ground level, other arrangements may be made which will perform satisfactorily and provide some of the advantages of the present system illustrated in detail herein.

Figure 7:
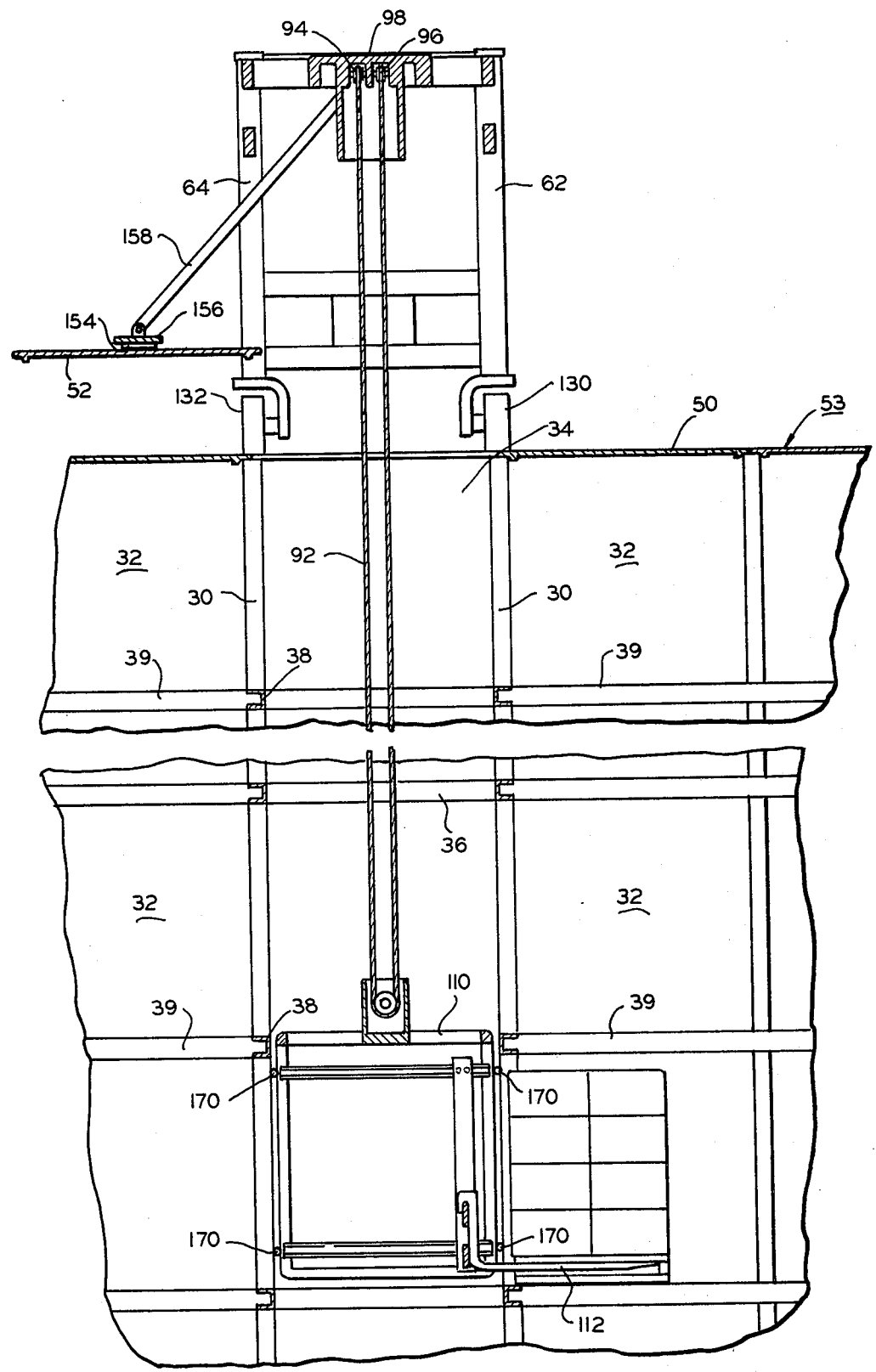
FIG. 7 is a fragmentary vertical cross sectional view of the storage structure shown in FIG. 1, illustrating the manner in which a load of products or material is moved into and deposited in a storage structure and removed therefrom.

The storage structure is illustrated in detail in FIGS. 1 and 7, and consists of a frame constructed of vertical steel I beams or channel iron members 30 spaced from one another and forming the vertical corners of the spaces or cells 32 in the storage structure and the corners of vertical shafts 34. Horizontal members or beams 36 and 38 interconnect the vertical members 30 in two lateral directions to form the cubical shaped spaces or cells 32 arranged in tiers along the sides of shaft 34 and having load supporting floors 39. The particular types of materials used in constructing the storage structure are not important; however steel members, such as mentioned herein, are satisfactory and can be assembled readily according to the design and size desired. The spaces or cells 32 may be left open, or they may be enclosed by any suitable plate material such as steel plates or fireproof paneling, and a fire extinguishing system may be included in the structure, such as a sprinkler system or some other suitable type of extinguishing system. The spaces or cells are open to shaft 34 and, in the arrangement illustrated in FIGS. 10 and 11, there are four cells opening into the shaft at each level. While five levels or tiers are illustrated in FIG. 1, the number of tiers may be substantially larger or somewhat less, depending upon the storage space desired.

The upper surface of the storage structure is covered by steel plates 50 or other suitable floor structures, and the opening into the upper end of shaft 34 is closed by a steel plate cover 52 so that when no shaft is being used, the entire upper surface forms a floor 53 over which loads of products and materials may be transported by either vehicle 14 or lift truck 24. When a load is to be deposited in the storage structure, vehicle 14 is operated to lift the load and transport it to a position over the shaft in which the load is to be lowered to the desired storage space or cell. One type of vehicle suitable for performing this operation is illustrated in FIGS. 2 through 6, the vehicle consisting of frame 60 having vertical posts 62, 64, 66 and 68 connected by side beams 70, 72, 74 and 76 and end beams 78 and 80. A carriage 90 is suspended inside the frame by cable 92 which is supported on sheaves 94 and 96 journaled in a frame structure 98. The cable is trained over pulleys 100 and 102 and wound on a motor driven reel (not shown) enclosed in a housing 104 mounted on cross members 106 and 108 connected to posts 62 and 64.

The carriage includes a cage 110 having a fork attachment 112 mounted therein and adapted to reciprocate from a position fully within the confines of the cage to a laterally extending position for discharging and picking up a load. The fork attachment may be moved to and from its lateral position by a hydraulic cylinder or other suitable motor means. The two tines 114 and 116 extend into a cell, normally beneath a pallet supporting a bin or other container in the cell. The cage and fork attachment are controlled from an operator's platform 120 having a control panel and levers 122 mounted thereon, the platform being rigidly mounted between posts 66 and 68. The platform is so positioned with respect to the cage that the operator can readily observe the position of the cage and the attachment. The frame 60 is supported by wheels 130, 132, 134 and 136 on the lower end of posts 62, 64, 66 and 68 respectively, two of said wheels, for example 130 and 132, being steerable, and the other two wheels, 134 and 136, being driven, for example, by electric or hydraulic motors controlled from control panel 122.

Figure 5:
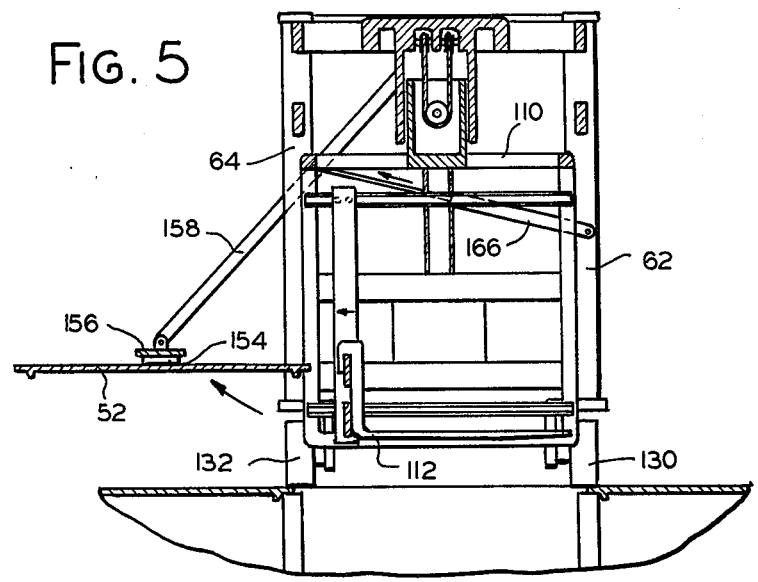
Figure 6:
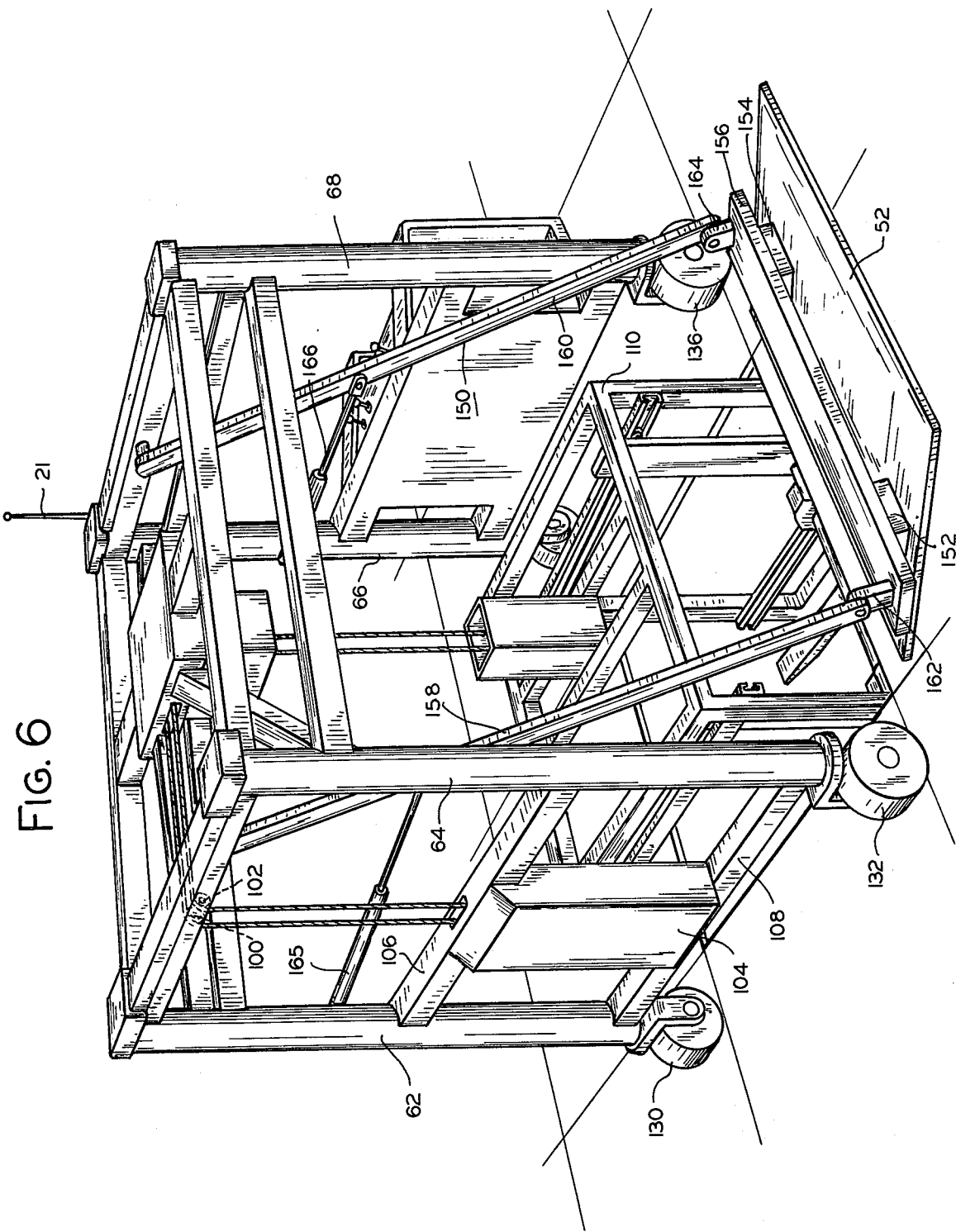
FIG. 6 is an enlarged perspective view of the vehicle shown in the preceding figures, illustrating more fully the manner in which the vehicle operates to place a load in and to remove a load from the storage structure.

The plate covers 52 on the upper end of shafts 34 remain closed until the vehicle 14 is maneuvered into position over the shaft, thereby increasing the safety of the vehicle until the operator is ready to lower a load into or remove a load from the shaft. A cover removing mechanism 150 is incorporated in the vehicle consisting of electromagnets 152 and 154 mounted on a support 156, which in turn is supported by arms 158 and 160. The upper ends of the two arms are pivoted to cross members 78 and 80 and pivotally connected to support member 156 by pivot means 162 and 164. The electromagnets are controlled by the operator through control panel 122, and the two arms are swung laterally by linear actuators 165 and 166, which may be either hydraulic cylinders or screw and nut type actuators. When the cover is to be removed, the vehicle is maneuvered over the shaft with the lifting apparatus 150 in the position illustrated in FIG. 3. The electromagnets then are energized, thereby raising the cover to the position illustrated in FIG. 4. With the cover held in this position, it can pass over the adjacent floor panels or structure. Operation of actuators 165 and 166 swings arms 158 and 160 laterally, carrying the cover laterally as illustrated in FIGS. 5 and 6, until the cover is fully to one side of the upper end of the shaft. When the cover has been moved to this position, the cage with the attachment and load contained therein is lowered into the shaft in the manner illustrated in FIG. 7, the cage preferably being guided and laterally supported by a plurality of rollers 170 disposed on the four sides of the cage in contact with members 30, which in effect form a mast for the carrier.

When the load has been lowered to the cell where it is to be deposited, the attachment is moved laterally, carrying the load into the cell where it is deposited, and the tines of the attachment are then withdrawn into the confines of the cage preparatory to returning the cage to its original position at the top of the shaft. In order to facilitate picking up and depositing loads in the desired position and to assist the operator in performing the complete function, in the shafts, television cameras in a closed circuit may be mounted on the cage so that the operator can observe the movement of the cage and attachment in positioning the load either for depositing it in or removing it from the storage space or cell. Any one of the four cells from which the load is to be removed is selected at the time the operator maneuvers the vehicle 14 above the shaft so that the attachment is facing in the proper direction to deposit the load in the selected cell when the cage is lowered into the shaft.

Figure 8:
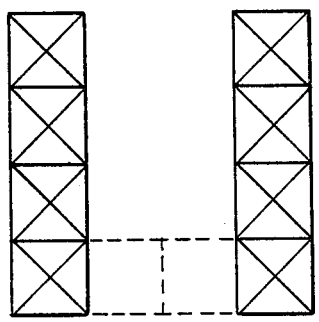
FIGS. 8 and 9 are schematic diagrams illustrating the storage structures of the prior art.
Figure 9:
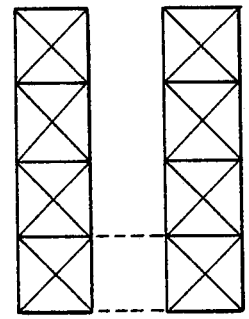
Figure 10:
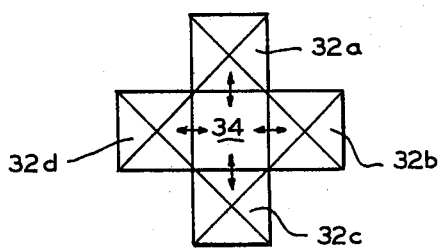
FIG. 10 is a schematic diagram of a block or module forming a basic section of the present storage structure.
Figure 11:
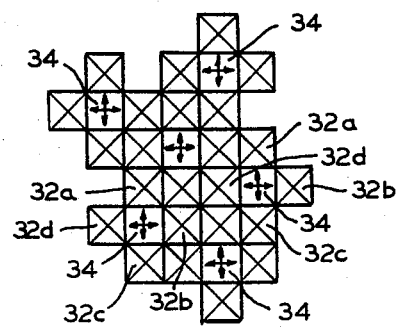
FIG. 11 is a schematic diagram illustrating the manner in which the basic block of FIG. 10 is used with other blocks to form the storage structure.

One of the basic features of the present invention is the arrangement of the tiers of storage spaces or cells. FIGS. 8 and 9 illustrate prior art conventional arrangements of tiers with the aisles therebetween, showing the amount of space which is required for a lift truck or the like to move loads to and from the bins. FIGS. 10 and 11 illustrate one of the preferred forms of the present invention, which consists of four tiers of cells 32a, 32b, 32c and 32d arranged around shaft 34. It is seen that this arrangement of cells can be assembled in the manner illustrated in FIG. 11, with one shaft in each instance serving four tiers of cells, with no duplication of accessibility from the plurality of shafts. The cage of the vehicle 14 can pass downwardly through any one of the shafts, and at any level can deposit or remove a load. This gives a high density storage space and yet provides ready accessibility to each load through the various shafts without having to move another load to reach the one desired. The size of the storage structure can meet any requirements, from the one module or block illustrated in FIG. 10 up to any number.

Figure 12:
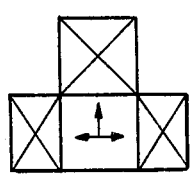
FIG. 12 is a schematic diagram of a modified form of the block or module adapted for use in forming the storage structure.
Figure 13:
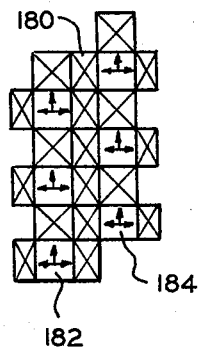
FIG. 13 is a schematic diagram illustrating the manner in which the block of FIG. 12 may be utilized in forming a storage structure.
Figure 14:
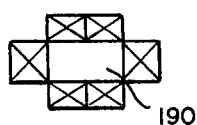
FIG. 14 is a schematic diagram of a different type of structure utilizing the block or module shown in FIG. 12.

The block or module illustrated in FIGS. 12 and 13 is designed to economize on the size of the cell and hence economize somewhat on the amount of space required for storage. In the arrangement illustrated in FIGS. 10 and 11, the cells are square and are inherently required to be that way in order to provide the interlocking arrangement of the blocks or modules. The interlocking blocks or modules of FIG. 12 are possible with two of the smaller cells, as illustrated in FIG. 13, since they are in rows 180 while the shafts are in rows 182, the cells in the latter rows being square and of the same size as in the first embodiment but the cells in rows 180 not as deep, i.e. they are more nearly the size of the conventional load stored on pallets in such storage structures. The arrangement illustrated in FIG. 14 utilizes the block or module of FIG. 12 with the long side of the two modules placed together to provide a large shaft 190 in which a larger cage or lift can be used in the shaft to permit an operator to descend into the storage stacks for picking parts of loads to fill orders without removing the entire load. This larger shaft arrangement gives the operator sufficient room to accompany a full bin to the various desired levels in fulfilling the orders. The space saving of this type is essentially the same as that of FIG. 13.

Figure 15:
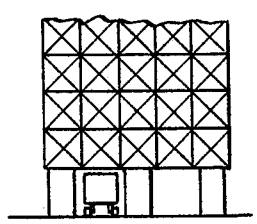
FIG. 15 is a schematic diagram illustrating a modified form of structure utilizing the block or module structural concept shown in FIGS. 10 through 14.

In the embodiment illustrated in FIG. 15, the cells are reached through the vertical shafts from the bottom of the shafts. In this embodiment, the aisles are provided beneath the shafts so that a lift mechanism in the shaft can raise and lower the loads to the desired level for discharging the load into and removing it from the cell. This is not the preferred arrangement, since the system would normally be entirely above ground level and would require the aisles beneath the shafts where the posts supporting the structure would interfere with the maneuverability of the vehicles beneath the shafts. The block or modular arrangement of FIGS. 12 and 13 lends itself better to this type of structure than the module of FIGS. 10 and 11, since the shafts of the former arrangement are in line with one another in every other tier.

In the operation and use of the present storage system constructed in the manner illustrated in FIG. 1, the vehicle is maneuvered over the floor formed by panels 50 and 52 above the cells and shafts, respectively, and a load of products or material, normally on a pallet and possibly in a bin, is unloaded from a truck with the use of a fork lift truck, and is placed on the aforementioned floor. The vehicle 14 then lifts the load by maneuvering the tines of the attachment under the pallet and retracts the load into cage 110. The vehicle then moves to a position over a particular shaft where the load is to be stored. As the vehicle is maneuvered oer the shaft and before cover 52 has been removed, the fork attachment is placed in position with the tines extending in the direction at which the load will be discharged, since the cage cannot be rotated after it has descended into the shaft. The electromagnets 152 and 154 are then energized to lift the steel cover 52 in the manner illustrated in FIG. 4 to a slightly elevated position, and the lift mechanism 150 swings laterally, carrying the plate to a position where the upper end of the shaft is completely uncovered. The cage and load are then lowered by the operator using controls 122 into the upper end of the shaft with the vertical members 30 at each corner of the shaft forming a mast or guide for the cage as it descends to a preselected level. When it reaches the selected level, the cage is stopped directly beside the cell in which the load is to be discharged.

Figure 3:
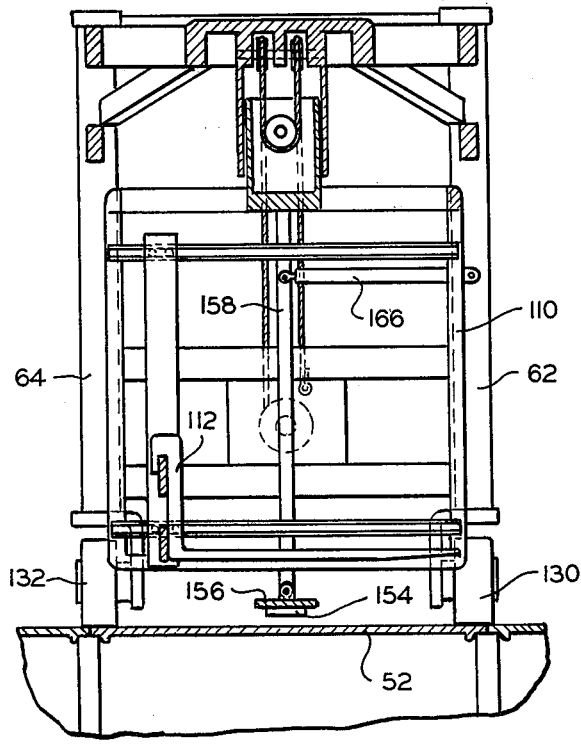
FIG. 3 is a cross sectional view taken on line 3 — 3 of FIG. 2, showing the vehicle in position to remove a load from one of the cells in the storage structure.
Figure 4:
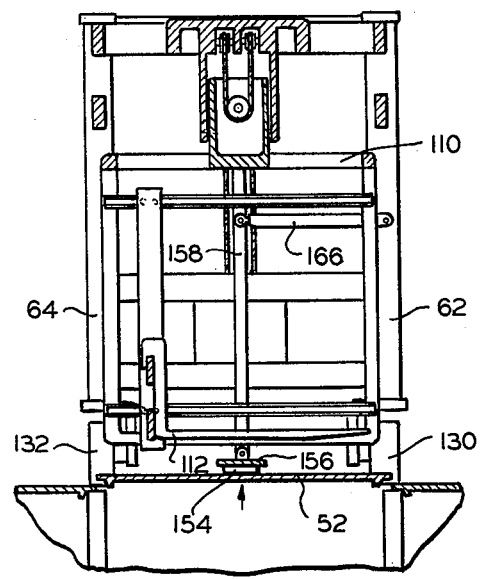
FIGS. 4 and 5 are cross sectional views similar to the sectional view of FIG. 3, showing the manner in which the vehicle initially operates to reach a shaft in the storage structure.

The operator then actuates the mechanism which moves the attachment laterally, carrying the load into the cell where it is lowered onto floor 39 thereof. The attachment is then retracted fully into the cage, leaving the load in the cell, and the cage is raised to its original position above the floor, and cover 52, which has been held in a lateral position during the aforementioned operation, is swung back into place directly over the shaft. When the plate has been lowered into its original position as illustrated in FIG. 3, the vehicle is then free to maneuver over the plate and the rest of floor 53 formed by the plates to any other shaft or to the truck to pick up another load. The removal of a load from a bin is accomplished by the same operation in reverse.

It is seen that with the present top loading storage structure, a dense, compact storage is accomplished with a minimum number of aisles, shafts or the like being required for moving products and material. Thus maximum space is utilized in the storage structure without the necessity of moving any other load in order to place a load in a cell or remove a load therefrom. The top loading arrangement also permits effective maneuvering of the vehicle to any location on the floor formed by the plates above the cells and shafts and to any shaft in which a load is to be lowered or raised. The building 16 which covers the top of the storage structure is free of any posts or other obstructions, and vehicle 14 can be operated effectively from an electrical grid on the ceiling or false ceiling above the floor through the trolley pole as illustrated in FIG. 1. Further, the storage structure can be placed completely underground, thereby maintaining a substantially uniform temperature in the entire storage area throughout the year with very little loss of heat, thus increasing the economy of the storage without danger of freezing occurring in the storage structure. While the broad concept of the vertical block or modular arrangement of cells served by a single shaft is most effectively utilized in the arrangement shown in FIG. 1, the arrangement shown in FIG. 15 may be suitable under certain conditions.

Only one embodiment of the present product and material storage system has been described in detail herein; however, various changes and modifications may be made without departing from the scope of the invention.

I claim:

1. A product and material storage system comprising a storage structure having a plurality of spaced vertical shafts with blocks of storage cells disposed on at least three sides of the shaft and arranged in vertical tiers of two or more separate cells for receiving and storing individual loads, said cells being directly and separately accessible from the respective adjacent shaft, a floor above said storage structure, a top cover for each of said shafts on substantially the same plane as said floor, lift means including a carriage and movable above said floor from one shaft to another with a load, said carriage including means for moving a load suspended thereby laterally into and from a cell along a shaft.

2. A product and material storage system as defined in claim 1 in which each of said shafts is rectangular in cross sectional shape and four cells are disposed around said shaft at each tier accessible from said shaft.

3. A product and material storage system as defined in claim 1 in which each of said shafts is rectangular in cross sectional shape and three cells are disposed on three sides of said shaft and accessible therefrom.

4. A product and material storage system as defined in claim 1 in which said shafts are arranged in said storage structure in parallel rows with tiers of cells disposed between said rows, the size of the cells between said rows being shallower than the cells disposed in said rows.

5. A product and material storage system as defined in claim 1 in which said vehicle includes a means for removing the cover from any one of said shafts, a hoist means having a cage for descending into a selected shaft, and means on said cage for supporting a load and for moving the load laterally into and from a pre-selected cell along the selected shaft.

6. A product and material storage system as defined in claim 1 in which said shafts are defined by a plurality of vertical posts and include tracks for guiding and stabilizing said carriage as it moves vertically in said shafts and while it is depositing a load in and removing a load from any one of the cells along the shaft.

7. In a product and material storage system having a plurality of spaced vertical shafts with cells disposed on at least three sides of the shaft and arranged in tiers of two or more cells, and a floor above said structure with covers for said shafts: a load handling vehicle for maneuvering a load over said floor and into a position above any selected shaft, including a means for removing the cover for said shaft, a hoist means having a carriage for descending into a selected shaft, and a means on said carriage for supporting a load and for moving a load laterally into and from any pre-selected cell along the selected shaft.

* * * * *